United States Patent
Zhou et al.

(10) Patent No.: US 10,713,352 B2
(45) Date of Patent: Jul. 14, 2020

(54) METHOD AND APPARATUS FOR TRUSTED MEASUREMENT

(71) Applicant: Huawei Technologies Co., Ltd., Shenzhen (CN)

(72) Inventors: Chong Zhou, Shenzhen (CN); Tianfu Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 207 days.

(21) Appl. No.: 15/461,244

(22) Filed: Mar. 16, 2017

(65) Prior Publication Data

US 2017/0193220 A1 Jul. 6, 2017

Related U.S. Application Data

(63) Continuation of application No. PCT/CN2015/086267, filed on Aug. 6, 2015.

(30) Foreign Application Priority Data

Sep. 16, 2014 (CN) .......................... 2014 1 0471558

(51) Int. Cl.
*G06F 21/57* (2013.01)
*G06F 21/52* (2013.01)
*G06F 21/55* (2013.01)

(52) U.S. Cl.
CPC ............ *G06F 21/52* (2013.01); *G06F 21/552* (2013.01); *G06F 21/57* (2013.01); *G06F 21/575* (2013.01); *G06F 2221/034* (2013.01)

(58) Field of Classification Search
CPC ...... G06F 21/52; G06F 21/575; G06F 21/552; G06F 21/57; G06F 2221/034
See application file for complete search history.

(56) References Cited

U.S. PATENT DOCUMENTS

2006/0075223 A1* 4/2006 Bade ...................... G06F 21/57
713/162
2006/0133612 A1* 6/2006 Abedi ...................... H04K 1/00
380/270

(Continued)

FOREIGN PATENT DOCUMENTS

CN 1987717 A 6/2007
CN 1991779 A 7/2007

(Continued)

OTHER PUBLICATIONS

"Information technology—Trusted Platform Module—Part 1:Overview" ISO/IEC 11889-1:2009, Geneva, Switzerland XP082004305, pp. i-12 (May 18, 2009).

(Continued)

*Primary Examiner* — Matthew T Henning
(74) *Attorney, Agent, or Firm* — Leydig, Voit & Mayer, Ltd.

(57) ABSTRACT

A method and an apparatus for trusted measurement, where the method includes: obtaining a first processing result by performing a first-manner processing on a code segment, and using a result obtained by performing a second-manner processing on the first processing result as a reference value; obtaining, at a first moment when the system is running, a second processing result by performing the first-manner processing on the code segment, and obtaining a first measurement value by performing the second-manner processing on the second processing result; and determining whether the first measurement value and the reference value are equal, and when the first measurement value and the reference value are equal, the system is trusted, where the code segment in the memory is a code segment that does not change with normal running of the system during one start-up and a running process of the system.

14 Claims, 2 Drawing Sheets

(56) References Cited

U.S. PATENT DOCUMENTS

| | | | |
|---|---|---|---|
| 2008/0077801 A1* | 3/2008 | Ekberg | G06F 21/554 713/187 |
| 2008/0104382 A1* | 5/2008 | Tarkkala | G06F 21/305 713/1 |
| 2008/0244746 A1 | 10/2008 | Rozas et al. | |
| 2008/0278285 A1* | 11/2008 | Matsushima | G06F 21/575 340/5.74 |
| 2009/0070598 A1* | 3/2009 | Cromer | G06F 21/575 713/193 |
| 2009/0144582 A1 | 6/2009 | Li et al. | |
| 2009/0288161 A1 | 11/2009 | Wei et al. | |
| 2011/0167503 A1* | 7/2011 | Horal | G06F 21/10 726/33 |
| 2013/0212369 A1 | 8/2013 | Imtiaz et al. | |
| 2014/0359239 A1* | 12/2014 | Hiremane | G06F 21/575 711/163 |
| 2016/0196415 A1 | 7/2016 | Liu et al. | |
| 2017/0193220 A1 | 7/2017 | Zhou et al. | |

FOREIGN PATENT DOCUMENTS

| | | |
|---|---|---|
| CN | 101038556 A | 9/2007 |
| CN | 101458743 A | 6/2009 |
| CN | 102436566 A | 5/2012 |
| CN | 103093150 A | 5/2013 |
| CN | 103124973 A | 5/2013 |
| CN | 103488937 A | 1/2014 |
| CN | 103973680 A | 8/2014 |
| CN | 104268461 A | 1/2015 |
| CN | 103577748 B | 1/2017 |
| WO | WO 2013101083 A1 | 7/2013 |

OTHER PUBLICATIONS

Zhiguo et al., "A Platform Access Control Algorithm with Time Self-Attestation Based on PCR Mechanism," Journal of Computer Research and Development, pp. 114-121 (Received on Jul. 7, 2006).

* cited by examiner

METHOD AND APPARATUS FOR TRUSTED MEASUREMENT

CROSS-REFERENCE TO RELATED APPLICATIONS

This application is a continuation of International Application No. PCT/CN2015/086267, filed on Aug. 6, 2015, which claims priority to Chinese Patent Application No. 201410471558.8, filed on Sep. 16, 2014. The disclosures of the aforementioned applications are hereby incorporated by reference in their entireties.

TECHNICAL FIELD

The present application relates to the field of security technologies, and in particular, to a method and an apparatus for trusted measurement.

BACKGROUND

In order to resolve insecurity of computer architectures and fundamentally improve trustworthiness of computers, the industry organizes the trusted computing platform alliance (TCPA). The TCPA defines a trusted platform module (TPM) with functions of secure storage and encryption. In March 2003, the TCPA was reorganized into a trusted computing group (TCG).

The TCG defines "trusted" as: when an entity is achieving a given objective, the entity is trusted if a behavior of the entity is always the same as that expected.

A main method of trusted computing is to perform identity verification, perform storage protection by using encryption, and perform integrity protection by using integrity measurement. A basic idea is to first establish, in a computer system, a trust root, and then establish a strip of trust chain. One level measures and authenticates another level, and one level trusts another level, extending a trust relationship to the entire computer system, so as to ensure that the computer system is trusted. Specifically, a TPM chip first measures integrity of current underlying firmware, and if a result of the measurement is correct, a normal system initialization is completed. Then the underlying firmware measures integrity of a basic input/output system (BIOS), if a result of the measurement is correct, the BIOS continues to measure integrity of an operating system, and if a result of the measurement is correct, the operating system runs normally, otherwise the running is stopped. Afterwards, the operating system measures an application and a new operating system component. A user determines whether to continue to trust this system platform after the operating system starts. In this way, the trustworthiness of the system platform is ensured by a process of establishing a trust chain.

However, the foregoing method for trusted measurement can be executed only in a start-up process of a system. After the start-up of the system is completed, software may be maliciously tampered, and the system cannot be ensured to be trusted without a method for trusted measurement.

SUMMARY

Embodiments of the present application provide a method and an apparatus for trusted measurement to resolve a technical problem in the prior art that trusted measurement cannot be performed after start-up of a system.

According to a first aspect, the present application provides a method for trusted measurement, including:

obtaining, when start-up of a system is completed, a first processing result by performing a first-manner processing on a code segment in a memory, and using a result obtained by performing a second-manner processing on the first processing result as a reference value;

obtaining, at a first moment when the system is running, a second processing result by performing the first-manner processing on the code segment in the memory, and obtaining a first measurement value by performing the second-manner processing on the second processing result; and determining whether the first measurement value and the reference value are equal, and if the first measurement value and the reference value are equal, the system is trusted, where the code segment in the memory is a code segment that does not change with normal running of the system during one start-up and a running process of the system.

With reference to the first aspect, in a first possible implementation manner of the first aspect, the obtaining a first processing result by performing a first-manner processing on a code segment in a memory, and using a result obtained by performing a second-manner processing on the first processing result as a reference value includes:

obtaining the first processing result by performing a hash calculation on the code segment in the memory;

obtaining the reference value by performing the hash calculation on the first processing result and a preset first value; and the obtaining a second processing result by performing the first-manner processing on the code segment in the memory, and obtaining a first measurement value by performing the second-manner processing on the second processing result includes:

obtaining the second processing result by performing the hash calculation on the code segment in the memory; and obtaining the first measurement value by performing the hash calculation on the second processing result and the first value.

With reference to the first possible implementation manner of the first aspect, in a second possible implementation manner of the first aspect, the first value is an initial value of a platform configuration register PCR after the system is restored, or the first value is a randomly generated value.

With reference to the first aspect, or the first possible implementation manner of the first aspect or the second possible implementation manner of the first aspect, in a third possible implementation manner of the first aspect, after the determining that the first measurement value and the reference value are equal, the method further includes:

using a result obtained by performing the second-manner processing on the second processing result as a first expected value;

obtaining, at a second moment when the system is running, a third processing result by performing the first-manner processing on the code segment in the memory;

obtaining a second measurement value by performing the second-manner processing on the third processing result, where the second moment is after the first moment; and determining whether the second measurement value and the first expected value are equal, and if the second measurement value and the first expected value are equal, the system is trusted.

With reference to the third possible implementation manner of the first aspect, in a fourth possible implementation manner of the first aspect, the using a result obtained by performing the second-manner processing on the second processing result as a first expected value includes:

obtaining the first expected value by performing the hash calculation on the second processing result and the reference value; and the obtaining a second measurement value by performing the second-manner processing on the third processing result includes:

obtaining the second measurement value by performing the hash calculation on the third processing result and the first measurement value.

With reference to the fourth possible implementation manner of the first aspect, in a fifth possible implementation manner of the first aspect, after the determining that the second measurement value and the first expected value are equal, the method further includes:

obtaining a second expected value by performing the hash calculation on the third processing result and the first expected value.

With reference to the first aspect, or the first possible implementation manner of the first aspect or the second possible implementation manner of the first aspect, in a sixth possible implementation manner of the first aspect, after the determining that the first measurement value and the reference value are equal, the method further includes:

using a result obtained by performing the second-manner processing on the second processing result as a first expected value; and determining, from the first moment and after a period of time of a trusted measurement interval is exceeded, whether a latest reference value is the same as the first expected value, and if the latest reference value is the same as the first expected value, the system is not trusted.

According to a second aspect, the application provides an apparatus for trusted measurement, including:

a measurement module, configured to obtain, when start-up of a system is completed, a first processing result by performing a first-manner processing on a code segment in a memory, and obtain, at a first moment when the system is running, a second processing result by performing the first-manner processing on the code segment in the memory; and a processing module, configured to: use a result obtained by performing a second-manner processing on the first processing result as a reference value, obtain a first measurement value by performing the second-manner processing on the second processing result, and determine whether the first measurement value and the reference value are equal, and if the first measurement value and the reference value are equal, the system is trusted, where the code segment in the memory is a code segment that does not change with normal running of the system during one start-up and a running process of the system.

With reference to the second aspect, in a first possible implementation manner of the second aspect, the measurement module is specifically configured to: obtain the first processing result by performing a hash calculation on the code segment in the memory, and obtain the second processing result by performing the hash calculation on the code segment in the memory; and the processing module is specifically configured to: obtain the reference value by performing the hash calculation on the first processing result and a preset first value, and obtain the first measurement value by performing the hash calculation on the second processing result and the first value.

With reference to the first possible implementation manner of the second aspect, in a second possible implementation manner of the second aspect, the first value is an initial value of a platform configuration register PCR after the system is restored, or the first value is a randomly generated value.

With reference to the second aspect, or the first possible implementation manner of the second aspect or the second possible implementation manner of the second aspect, in a third possible implementation manner of the second aspect, the processing module is further specifically configured to: use, after determining that the first measurement value and the reference value are equal, a result obtained by performing the second-manner processing on the second processing result as a first expected value;

the measurement module is further configured to obtain, at a second moment when the system is running, a third processing result by performing the first-manner processing on the code segment in the memory; and the processing module is further configured to: obtain a second measurement value by performing the second-manner processing on the third processing result, where the second moment is after the first moment; and determine whether the second measurement value and the first expected value are equal, and if the second measurement value and the first expected value are equal, the system is trusted.

With reference to the third possible implementation manner of the second aspect, in a fourth possible implementation manner of the second aspect, the processing module is specifically configured to: obtain the first expected value by performing the hash calculation on the second processing result and the reference value; and obtain the second measurement value by performing the hash calculation on the third processing result and the first measurement value.

With reference to the fourth possible implementation manner of the second aspect, in a fifth possible implementation manner of the second aspect, the processing module is further configured to: obtain a second expected value by performing the hash calculation on the third processing result and the first expected value after determining that the second measurement value and the first expected value are equal.

With reference to the second aspect, or the first possible implementation manner of the second aspect or the second possible implementation manner of the second aspect, in a sixth possible implementation manner of the second aspect, the processing module is further configured to: use, after determining that the first measurement value and the reference value are equal, a result obtained by performing the second-manner processing on the second processing result as a first expected value; and determine, from the first moment and after a period of time of a trusted measurement interval is exceeded, whether a latest reference value is the same as the first expected value, and if the latest reference value is the same as the first expected value, the system is not trusted.

According to a third aspect, the present application further provides a computer system, including:

a processor, configured to obtain, when start-up of a system is completed, a first processing result by performing a first-manner processing on a code segment in a memory, and obtain, at a first moment when the system is running, a second processing result by performing the first-manner processing on the code segment in the memory; and a trusted platform module TPM chip, configured to use a result obtained by extending the first processing result to a PCR as a reference value, where the processor is further configured to: obtain a first measurement value by performing the extension on the second processing result, and determine whether the first measurement value and the reference value are equal, and if the first measurement value and the reference value are equal, the system is trusted, and the code segment in the memory is a code segment that does not change with normal running of the system during one start-up and a running process of the system.

With reference to the third aspect, in a first possible implementation manner of the third aspect, the processor is specifically configured to: obtain the first processing result by performing a hash calculation on the code segment in the memory, and obtain the second processing result by performing the hash calculation on the code segment in the memory; and the TPM chip is specifically configured to: obtain the reference value by performing the hash calculation on the first processing result and a preset first value; and the processor is specifically configured to obtain the first measurement value by performing the hash calculation on the second processing result and the first value.

With reference to the first possible implementation manner of the third aspect, in a second possible implementation manner of the third aspect, the first value is an initial value of a PCR after the system is restored, or the first value is a randomly generated value.

With reference to the third aspect, or the first possible implementation manner of the third aspect or the second possible implementation manner of the third aspect, in a third possible implementation manner of the third aspect, the TPM chip is further specifically configured to: use, after determining that the first measurement value and the reference value are equal, a result obtained by extending the second processing result to the PCR as a first expected value; and the processor is further configured to: obtain, at a second moment when the system is running, a third processing result by performing the first-manner processing on the code segment in the memory, obtain a second measurement value by performing the extension on the third processing result, and determine whether the second measurement value and the first expected value are equal, and if the second measurement value and the first expected value are equal, the system is trusted, where the second moment is after the first moment.

With reference to the third possible implementation manner of the third aspect, in a fourth possible implementation manner of the third aspect, the TPM chip is specifically configured to: obtain the first expected value by performing the hash calculation on the second processing result and the reference value; and the processor is further configured to obtain the second measurement value by performing the hash calculation on the third processing result and the first measurement value.

With reference to the fourth possible implementation manner of the third aspect, in a fifth possible implementation manner of the third aspect, the TPM chip is further configured to: obtain a second expected value by performing the hash calculation on the third processing result and the first expected value after determining that the second measurement value and the first expected value are equal.

With reference to the third aspect, or the first possible implementation manner of the third aspect or the second possible implementation manner of the third aspect, in a sixth possible implementation manner of the third aspect, the TPM chip is further configured to: use, after determining that the first measurement value and the reference value are equal, a result obtained by extending the second processing result to the PCR as a first expected value; and determine, from the first moment and after a period of time of a trusted measurement interval is exceeded, whether a latest reference value is the same as the first expected value, and if the latest reference value is the same as the first expected value, the system is not trusted.

One or more technical solutions provided in the embodiments of the present application at least have the following technical effects or advantages.

In the embodiments of the present application, when start-up of a system is completed, a first processing result is obtained by performing a first-manner processing on a code segment in a memory, and the first processing result is extended to a platform configuration register PCR to serve as a reference value; at a first moment when the system is running, a second processing result is obtained by performing the first-manner processing on the code segment in the memory, and a first measurement value is obtained by extending the second processing result; and whether the first measurement value and the reference value are equal is determined, and if the first measurement value and the reference value are equal, the system is trusted, where the code segment in the memory is a code segment that does not change with normal running of the system during one start-up and a running process of the system. Since there is no chance for code in the memory to be tampered when the start-up of the system is completed, the first-manner processing is performed on the code segment in the memory at the moment, and then the second-manner processing is performed on a processing result, and a result of the second-manner processing is used as a reference value. In this case, the reference value is trusted. Then when the system is running, the first-manner processing may be performed on the code in the memory again, and the same second-manner processing is performed on the processing result, the result of the second-manner processing is used as the reference value, and then whether the first measurement value and the reference value are equal is determined, and if the first measurement value and the reference value are equal, it indicates that the system is trusted. If the code in the memory is not tampered during the running process of the system, the first measurement value is equal to the reference value. If the first measurement value obtained by processing in the same processing manner is not equal to the reference value, it may be learnt that the system is not trusted because only the code in the memory is tampered and the code segment does not change with the normal running of the system. In this case, it can be seen that the embodiments of the present application provide a method for trusted measurement to a system after the start-up of the system, which may measure whether the system is trusted during running.

DESCRIPTION OF EMBODIMENTS

Embodiments of the present application provide a method and an apparatus for trusted measurement to resolve a technical problem in the prior art that trusted measurement cannot be performed after start-up of a system.

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without any creative effort shall fall within the protection scope of the present application.

Figure 1:
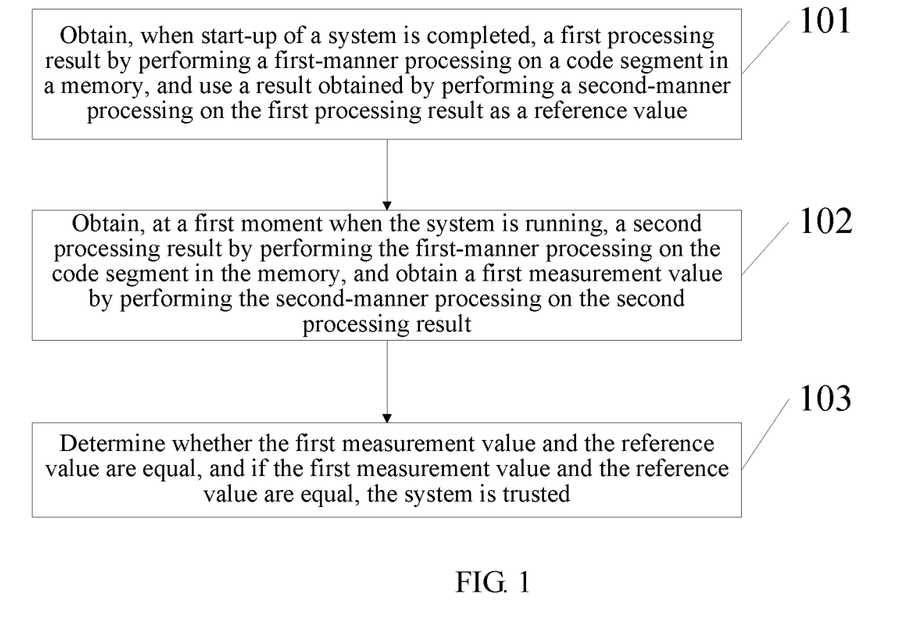
FIG. 1 is a flowchart of a method for trusted measurement in an embodiment of the present application.

An embodiment of the present application provides a method for trusted measurement. Referring to FIG. 1, FIG. 1 is a flowchart of a method for trusted measurement in the embodiment of the present application, and the method includes the following content:

step 101: Obtain, when start-up of a system is completed, a first processing result by performing a first-manner processing on a code segment in a memory, and use a result obtained by performing a second-manner processing on the first processing result as a reference value;

step 102: Obtain, at a first moment when the system is running, a second processing result by performing the first-manner processing on the code segment in the memory, and obtain a first measurement value by performing the second-manner processing on the second processing result;

step 103: Determine whether the first measurement value and the reference value are equal, and if the first measurement value and the reference value are equal, the system is trusted.

The code segment in the embodiment is a code segment that does not change with normal running of the system during one start-up and a running process of the system. The code segment may be all code segments in the memory, for example, in an embedded system, after start-up of the system is completed, all code may reside in the memory, and do not change with normal running of the system. The code segment may also be a part of code segments in the memory, for example, in some non-embedded systems, a part of code segments are fixed, and a code segment of some applications is often loaded into a memory when the application is running, and when the application is closed, the code segment in this part may be deleted from the memory, and therefore the code segments in the whole memory may change with the normal running of the system, and the code segment under this condition refers to the fixed part of code segments in the non-embedded systems.

Optionally, a trusted measurement process performed by a TPM chip as described in the background may be performed during a start-up process of the system. In this way, it may be guaranteed that the system is trusted when the start-up is completed.

When the start-up of the system is completed, at the moment, there is no chance for the code segment in the memory to be tampered, and the code segment in the memory is trusted, in this case, step 101 is performed. The second processing result is obtained by performing the first-manner processing on the code segment in the memory, where the first-manner processing is, specifically, for example, a hash calculation. When performing the hash calculation, hash values of two sets of data are matched only when corresponding data are also matched. A few changes in the data may lead to a lot of unpredictable changes in the hash value. Therefore, as long as the code segments in the memory are the same, the hash values obtained by the hash calculation must be the same. However, when the code segments in the memory are different, the hash values obtained by the hash calculation must be different. In other words, when the code segments in the memory need to be different, the processing results obtained by the first-manner processing must be different. Therefore, apart from the hash calculation, the first-manner processing may also be another calculation manner that meets the foregoing conditions.

In this embodiment, the hash calculation is taken as an example of the first-manner processing. In this way, the obtaining a first processing result by performing a first-manner processing on a code segment in a memory includes: obtaining the first processing result by performing the hash calculation on the code segment in the memory. The first processing result is, for example, a message digest with a fixed length, where the length is related to a hash algorithm specifically adopted. After processing is performed by the hash algorithm, a volume of the data is decreased, thereby saving storage space.

After the first processing result is obtained, a second-manner processing is performed on the first processing result, and a result of the second-manner processing is used as a reference value. The second-manner processing is specifically, for example, performing encryption processing, or performing storage according to a rule. By means of the step, it may increase a difficulty on cracking the data.

A possible manner is: in order to guarantee the security of the first processing result, in step 101, the using a result obtained by performing a second-manner processing on the first processing result as a reference value is specifically: using a result obtained by extending the first processing result to a platform configuration register (PCR) as the reference value.

As for the PCR, in order to prevent a value in the PCR from being arbitrarily tampered or counterfeited by malicious code, a TPM restricts an operation on the PCR, so that a read-write operation cannot be arbitrarily performed by using port mapping like a register of an ordinary character device. Moreover, the PCR is located inside the TPM, and internal data of the PCR is protected by the TPM. The TPM only allows two kinds of operations to modify the value of the PCR: a reset operation (Reset) and an extension operation (Extend). The reset operation occurs after the machine loses power or the system restarts, and the value of the PCR is automatically reset.

During the running process of the system, content of the PCR can be changed only by the extension operation. The extension operation: PCR [i]=Hash Algorithm (PCR [i-1] ||new measurement value), where i is a positive integer. The extension operation is irreversible, that is, a value of the PCR obtained by first extending a measurement value A and then extending a measurement value B is different from a result obtained by first extending the B and then extending the A. By means of extension, the PCR can record a measurement value sequence with an infinite length, and the sequence constituted by this series of measurement values reflects transition of a system state. One measurement value in this extension sequence is changed, and all subsequent measurement sequences may be affected.

Therefore, the result obtained by extending the first processing result to the PCR is used as the reference value, that is, the extension operation is performed on the PCR. According to the foregoing formula of the extension operation, specifically, the reference value is obtained by performing the same hash calculation on the first processing result and a first value, where the first processing result corresponds to the new measurement value in the formula, the first value corresponds to the PCR [i-1] in the formula, and the reference value corresponds to the PCR [i] in the formula. In a practical application, the first value is an initial value of the PCR after the system is restored, or the first value is a randomly generated value. Generally, the foregoing reset operation is performed on the PCR when the system is restored, and an initial value of the PCR is 0x00. While for a randomly generated value, it is more difficult to be obtained or tampered, and therefore it is more reliable. Certainly, in the practical application, if the trusted measurement is executed during the start-up process, the first value may also specifically be a last value of the trusted measurement during the start-up process.

When start-up of the system is completed, step 101 is executed to obtain the reference value. Then, at a first moment when the system is running, the code segment in the memory is measured again, that is, step 102 is executed, where a second processing result is obtained by performing the foregoing first-manner processing on the code segment in the memory, and the second-manner processing is performed on the second processing result, for example, a first measurement value is obtained by performing the extension on the second processing result. That the code segment in the memory is measured again uses the same manner as that in step 101, in this way, a same measurement standard may be guaranteed. Besides, in step 101, for the sake of the security of the first processing result, the first processing result is extended to the PCR to serve as the reference value, in this way, that the reference value is not easily tampered is ensured. Therefore, in step 102, the same extension operation also needs to be performed on the second processing result, which may not necessarily be extended to the PCR, but is performed with the same extension operation, and the first measurement value is obtained at this moment.

Therefore, step 102, similar to step 101, specifically includes: obtaining the second processing result by performing the same hash calculation on the code segment in the memory; and obtaining the first measurement value by performing the same hash calculation on the second processing result and the first value.

Then step 103 is executed, that is, whether the first measurement value and the reference value are equal is determined. Since the first measurement value and the reference value are both obtained by performing the same processing on the code segment in the memory and performing the same extension operation on the processing results just at different time, if the first measurement value and the reference value are the same, it indicates that code segments in the memory are the same; in other words, at a first moment, the code segment in the memory does not change compared with that at the time when the system just starts up, that is, at the first moment, the code segment in the memory has not been tampered, so that the system is trusted. If a determined result is that the first measurement value and the reference value are different, it indicates that, at the first moment, the code segment in the memory has been changed, that is, the code segment has been tampered, which indicates that the system is not trusted at this moment.

When the system is running, step 102 and step 103 may be repeatedly executed, for example being executed periodically, so as to perform real-time monitoring on whether the system is trusted.

It should be noted that, when step 102 is executed, in order to avoid a case in which a trusted measurement program itself is measured, that is, the processing manner of step 102 is tampered, a first measurement value returned by a malicious program every time is the same as the reference value, and the determined result of step 103 every time is that the first measurement value is equal to the reference value, a result that the system is trusted is obtained, but the code segment in the memory has been tampered actually, so that the trusted measurement program itself may be solidified in a chip. For example the trusted measurement program is solidified in a central processing unit (CPU), where the program does not allow any update operation, and is perpetually executed in a read-only manner, in this way, it is ensured that the trusted measurement program cannot be tampered, then the first measurement value obtained every time is real, and a conclusion obtained in step 103 is correct. Under the situation, step 102 may be periodically executed by a security engine in CPU.

If the trusted measurement program itself is not solidified in the chip, the reliability of the trusted measurement may further be enhanced in the following manners.

Specifically, in step 103, after the determining that the first measurement value and the reference value are equal, the method further includes: performing the second-manner processing on the second processing result, for example, extending the second processing result to the PCR, and using a result of the extension as a first expected value; obtaining, at a second moment when the system is running, a third processing result by performing the first-manner processing on the code segment in the memory; obtaining a second measurement value by performing the second-manner processing on the third processing result, where the second moment is after the first moment; and determining whether the second measurement value and the first expected value are equal, and if the second measurement value and the first expected value are equal, the system is trusted.

A principle of the extension operation is the same as the foregoing principle of the extension operation. The extending the second processing result to the PCR, and using a result of the extension as a first expected value is specifically: obtaining the first expected value by performing a hash calculation on the second processing result and the reference value. Because the first measurement value is equal to the reference value, it indicates that code in the memory is not tampered and the second processing result is trusted, the second processing result may be extended to the PCR to serve as the first expected value. In addition, the first expected value serves as the reference value for determining next time. In other words, when a new measurement result is extended to the PCR to serve as a new reference value, the reference value changes successively with an increase of a number of times of measurements. In this way, it may increase difficulty for a hacker to acquire the reference value, so as to improve the security.

At a second moment when the system is running, the code segment in the memory is measured again, that is, the third processing result is obtained by performing the first-manner processing on the code segment in the memory, and the second measurement value is obtained by performing the same extension on the third processing result. The specific implementation manner is similar to step 102, and is only executed at different moments. In an executing process at the second moment, the obtaining the second measurement value by extending the third processing result is specifically: obtaining the second measurement value by performing the hash calculation on the third processing result and the first measurement value. The first measurement value and the reference value are equal, and therefore in a processing process at the second moment, if the code segment in the memory is not tampered, the obtained third processing result and the second processing result are the same, and the second measurement value obtained after performing the same extension on the third processing result and the second processing result equals to the first expected value; therefore, by determining whether the second measurement value and the first expected value are equal, a measurement result at the second moment may be determined, that is, at the second moment, whether the system is trusted. If the second measurement value and the first expected value are equal, it indicates that the system is trusted, and if the second measurement value and the first expected value are not equal, it indicates that the system is not trusted.

Therefore, the measurement manner may also be regarded as: first calculating, according to the reference value and the second processing result, an expected value, then measuring code in a current memory, and comparing whether a measurement result meets the expected value, and if the measurement result meets the expected value, the system is trusted, and if the measurement result does not meet the expected value, the system is not trusted.

Afterwards, it may continue to circulate according to the measurement manner, for example, after the determining that the second measurement value and the first expected value are equal, the method further includes: obtaining the second expected value by performing the hash calculation on the third processing result and the first expected value. Then the second expected value serves as the reference value for the trusted measurement next time.

Optionally, if the first measurement value and the reference value are not equal, the second processing result may not be extended to obtain the first expected value, and the reference value in the PCR may not change. Similarly, if the second measurement value and the first expected value are not equal, the third processing result may not be extended to obtain the second expected value, and then the reference value in the PCR is still the first expected value. Alternatively, if the system is attacked and cannot execute a measurement operation, a latest reference value in the PCR does not change either. Therefore, whether the system is trusted may also be confirmed by determining if there is any change in the latest reference value in the PCR compared with a previous reference value, if there is no change, the system is not trusted. If there is a change, the system may be considered as trusted. However, in order to improve the reliability, the measurement result may be compared with the latest reference value after a next measurement, if the measurement result and the latest reference value are equal, the system is trusted, and if the measurement result and the latest reference value are not equal, the system is not trusted.

For example, if the first measurement value and the reference value are determined to be equal in step 103, the second-manner processing is performed on the second processing result, for example the second processing result is extended to the PCR to serve as the first expected value. From the first moment, after a period of time of a trusted measurement interval is exceeded, that is, after the second moment, and before a next measurement moment, for example before the third moment, whether the latest reference value in the PCR is the same as the first expected value is determined; and if the latest reference value in the PCR is the same as the first expected value, it indicates that, in a measurement at the second moment, the second measurement value and the first expected value are not equal, or there is no measurement at the second moment, which indicates that the system has been attacked and is not trusted; and if the latest reference value in the PCR is not the same as the first expected value, it indicates that, in the measurement at the second moment, the second measurement value and the first expected value are equal, thereby obtaining the second expected value, that is, the latest reference value, and therefore it indicates that the system is trusted at this moment.

The PCR may determine whether there is any change in the latest reference value compared with the previous reference value by itself, and then output the determined result, for example giving an alarm. A management device such as a network management may also read the latest reference value and the previous reference value in the PCR, and if it is found that the latest reference value is not changed after a period of time of a measurement interval is exceeded, it is considered that the system has been attacked, and the alarm may be given at this moment.

Optionally, a function of a hardware watchdog may also be set, specifically, when it is found that the latest reference value is not changed after the period of time of a measurement interval is exceeded, the system is restarted compulsively.

Optionally, the method for trusted measurement in the embodiment of the present application may be applied to the embedded system, or may also be applied to another software system with a fixed code segment, or a system of a code segment including a dynamic allocation address. Certainly, it may also be applied to the non-embedded system.

It can be seen from the above description that, by means of the method for trusted measurement in this embodiment, a trusted measurement may be performed on a system after the system starts up, and is capable of real-timely perceiving integrity state of code, thereby contributing to quickly discovering risks of malicious code implantation and manipulation from a hacker. In particular, as for a carrier-grade device, a restart of a system is often performed once in several months or even several years, and therefore a trusted measurement after the system starts up is of greater significance.

Figure 2:
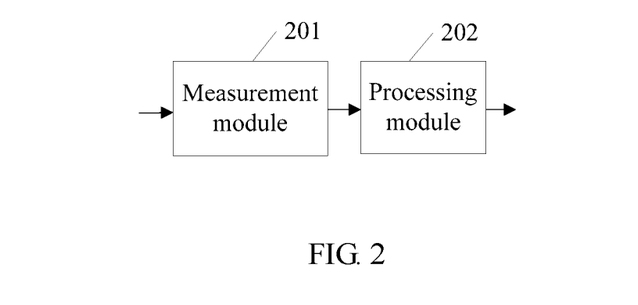
FIG. 2 is a functional block diagram of an apparatus for trusted measurement in an embodiment of the present application.

Based on a same inventive concept, an embodiment of the present application further provides an apparatus for trusted measurement. Referring to FIG. 2, the apparatus includes: a measurement module 201, configured to obtain, when start-up of a system is completed, a first processing result by performing a first-manner processing on a code segment in a memory, and obtain, at a first moment when the system is running, a second processing result by performing the first-manner processing on the code segment in the memory; and a processing module 202, configured to use a result obtained by performing a second-manner processing on the first processing result as a reference value, obtain a first measurement value by performing the second-manner processing on the second processing result; and determine whether the first measurement value and the reference value are equal, and if the first measurement value and the reference value are equal, the system is trusted, where the meaning of the code segment in the memory is the same as those in the foregoing embodiment.

Optionally, the measurement module 201 is specifically configured to: obtain the first processing result by performing a hash calculation on the code segment in the memory, and obtain the second processing result by performing the hash calculation on the code segment in the memory; and the processing module 202 is specifically configured to: obtain the reference value by performing the hash calculation on the first processing result and a preset first value, and obtain the first measurement value by performing the hash calculation on the second processing result and the first value.

Optionally, the first value is an initial value of a PCR after the system is restored, or the first value is a randomly generated value.

Optionally, the processing module 202 is further specifically configured to: use, after determining that the first measurement value and the reference value are equal, a result obtained by performing the second-manner processing on the second processing result as a first expected value;

the measurement module 201 is further configured to obtain, at a second moment when the system is running, a third processing result by performing the first-manner processing on the code segment in the memory; and the processing module 202 is further configured to: obtain a second measurement value by performing the second-manner processing on the third processing result, where the second moment is after the first moment; and determine whether the second measurement value and the first expected value are equal, and if the second measurement value and the first expected value are equal, the system is trusted.

Optionally, the processing module 202 is specifically configured to: obtain the first expected value by performing the hash calculation on the second processing result and the reference value; and obtain the second measurement value by performing the hash calculation on the third processing result and the first measurement value.

Optionally, the processing module 202 is further configured to: obtain a second expected value by performing the hash calculation on the third processing result and the first expected value after determining that the second measurement value and the first expected value are equal.

Optionally, the processing module 202 is further configured to: use, after determining that the first measurement value and the reference value are equal, a result obtained by performing the second-manner processing on the second processing result as the first expected value; and determine, from the first moment and after a period of time of a trusted measurement interval is exceeded, whether a latest reference value is the same as the first expected value, and if the latest reference value is the same as the first expected value, the system is not trusted.

Various changing manners and specific embodiments of the method for trusted measurement in the foregoing embodiment of FIG. 1 are also applicable to the apparatus for trusted measurement in this embodiment, and by means of the detailed description of the foregoing method for trusted measurement, a person skilled in the art may clearly understand the implementation method of the apparatus for trusted measurement in this embodiment, which may not be described in detail herein for concision of the description.

Figure 3:
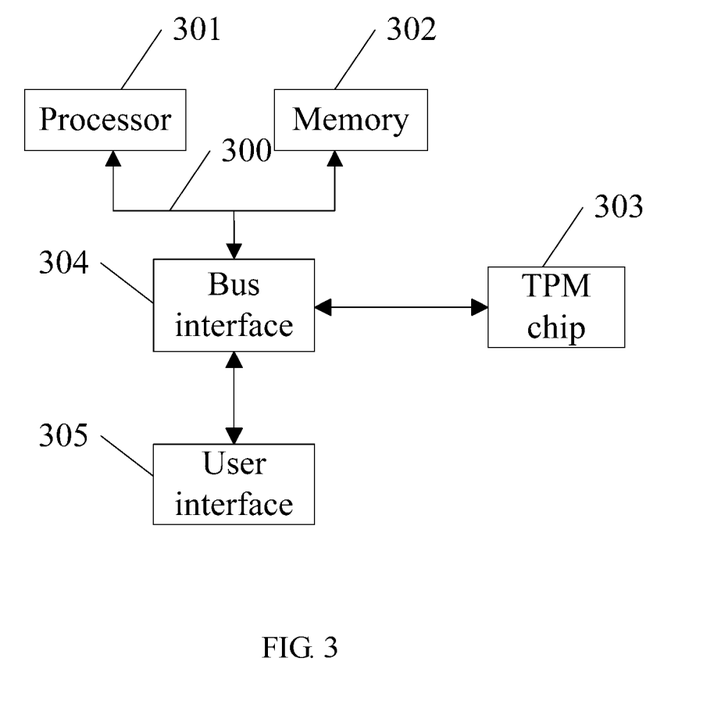
FIG. 3 is a system block diagram of a computer system in an embodiment of the present application.

Based on a same inventive concept, an embodiment of the present application further includes a computer system. Referring to FIG. 3, FIG. 3 is a system diagram of the computer system in the embodiment of the present application. As shown in FIG. 3, the system includes: a processor 301, configured to obtain, when start-up of a system is completed, a first processing result by performing a first-manner processing on a code segment in a memory, and obtain, at a first moment when the system is running, a second processing result by performing the first-manner processing on the code segment in the memory; a TPM chip 303, configured to use a result obtained by extending the first processing result to a PCR as a reference value, where the processor 301 is further configured to: obtain a first measurement value by performing the extension on the second processing result, and determine whether the first measurement value and the reference value are equal, and if the first measurement value and the reference value are equal, the system is trusted, where the meaning of the code segment in the memory is the same as those in the foregoing embodiment.

Optionally, the processor 301 is specifically configured to: obtain the first processing result by performing a hash calculation on the code segment in the memory, and obtain the second processing result by performing the hash calculation on the code segment in the memory; the TPM chip 303 is specifically configured to: obtain the reference value by performing the hash calculation on the first processing result and a preset first value; and the processor 301 is specifically configured to obtain the first measurement value by performing the hash calculation on the second processing result and the first value.

Optionally, the first value is an initial value of the PCR after the system is restored, or the first value is a randomly generated value.

Optionally, the TPM chip 303 is further specifically configured to: use, after determining that the first measurement value and the reference value are equal, a result obtained by extending the second processing result to the PCR as a first expected value; and the processor 301 is further configured to: obtain, at a second moment when the system is running, a third processing result by performing the first-manner processing on the code segment in the memory, obtain a second measurement value by performing the extension on the third processing result, and determine whether the second measurement value and the first expected value are equal, and if the second measurement value and the first expected value are equal, the system is trusted, where the second moment is after the first moment.

Optionally, the TPM chip 303 is configured to: obtain the first expected value by performing the hash calculation on the second processing result and the reference value; and the processor 301 is further configured to obtain the second measurement value by performing the hash calculation on the third processing result and the first measurement value.

Optionally, the TPM chip 303 is further configured to: obtain a second expected value by performing the hash calculation on the third processing result and the first expected value after determining that the second measurement value and the first expected value are equal.

Optionally, the TPM chip 303 is further configured to: use, after determining that the first measurement value and the reference value are equal, a result obtained by extending the second processing result to the PCR as a first expected value; and determine, from the first moment and after a period of time of a trusted measurement interval is exceeded, whether a latest reference value is the same as the first expected value, and if the latest reference value is the same as the first expected value, the system is not trusted.

In the above embodiments, the PCR is located on the TPM chip 303.

In FIG. 3, bus architecture (represented by a bus 300), that is, the bus 300 may include any number of interconnected buses and bridges, and the bus 300 links one or more processors represented by the processor 301 with various circuits of a memory represented by a memory 302. The bus 300 may also link various other circuits such as a peripheral device, a voltage stabilizer and a power management, which are all known in the art, and may not be further described herein. A bus interface 304 provides an interface between the bus 300 and the processor 301 and/or the TPM chip 303, and may also provide, depending on the nature of the computer system, a user interface 305, such as a keypad, a display, a loudspeaker, a microphone or a joystick.

The processor 301 is responsible for managing the bus 300 and general processing, and the memory 302 may be used for storing data used by the processor 301 when executing an operation.

Various changing manners and specific embodiments of the method for trusted measurement in the foregoing embodiment of FIG. 1 are also applicable to the computer system in this embodiment, and by means of the detailed description of the foregoing method for trusted measurement, those skilled in the art may clearly understand the implementation method of the computer system in this embodiment, which may not be described in detail herein for concision of the description.

One or more technical solutions provided in the embodiments of the present application at least have the following technical effects or advantages.

The system is trusted, where the code segment in the memory is a code segment that does not change with normal running of the system during one start-up and a running process of the system. Since there is no chance for code in the memory to be tampered when the start-up of the system is completed, a first-manner processing is performed on a code segment in a memory at the moment, and then a second-manner processing is performed on a processing result, and a result of the second-manner processing is used as a reference value. In this case, the reference value is trusted. Then when the system is running, the first-manner processing may be performed on the code in the memory again, and the same second-manner processing is performed on the processing result, the result of the second-manner processing is used as the reference value, and then whether the first measurement value and the reference value are equal is determined, and if the first measurement value and the reference value are equal, it indicates that the system is trusted. If the code in the memory is not tampered during the running process of the system, the first measurement value is equal to the reference value. If the first measurement value obtained by processing in the same processing manner is not equal to the reference value, it may be learnt that the system is not trusted because only the code in the memory is tampered and the code segment does not change with the normal running of the system. In this case, it can be seen that the embodiments of the present application provide a method for trusted measurement to a system after the start-up of the system, which may measure whether the system is trusted during running.

A person skilled in the art should understand that the embodiments of the present application may be provided as a method, a system or a computer program product. Accordingly, the present application may adopt a form of a complete hardware embodiment, a complete software embodiment, or an embodiment combining software and hardware. Moreover, the present application may adopt a form of a computer program product which is implemented on one or more computer-usable storage media (including, but not limited to, a magnetic disk memory, an optical memory and the like) containing a computer usable program code.

The present application is described in accordance with a flowchart and/or block diagrams of the method, the device (system) and the computer program product in the embodiments of the present application. It should be understood that, computer program instructions may be used to implement each flow and/or block in the flowchart and/or the block diagrams, and a combination of flows and/or blocks in the flowchart and/or the block diagrams. These computer program instructions may be provided to a general-purpose computer, a special-purpose computer, an embedded processor or a processor of other programmable data processing devices to generate a machine, thereby enabling the instructions executed by the computers or the processor of the other programmable data processing devices to produce an apparatus used for implementing an appointed function in one flow or multiple flows of the flowchart and/or one block or multiple blocks of the block diagrams.

These computer program instructions may also be stored in a computer readable memory capable of guiding the computers or the other programmable data processing devices to work in a particular manner, thereby enabling the instructions stored in the computer readable memory to produce products including an instruction apparatus, where the instruction apparatus implements the appointed function in one flow or multiple flows of the flowchart and/or one block or multiple blocks of the block diagrams.

These computer program instructions may also be loaded onto the computers or the other programmable data processing devices, to execute a series of operation steps on the computers or the other programmable data processing devices so as to produce processing implemented by the computers, such that the instructions executed on the computers or the other programmable data processing devices provide a step used for implementing the appointed function in one flow or multiple flows of the flowchart and/or one block or multiple blocks of the block diagrams.

Apparently, a person skilled in the art may make various modifications and variations to the present application without departing from the spirit and scope of the present application. In this way, if these modifications and variations of the present application belong to the scope of the claims of the present application and the equivalent technology thereof, then the present application is intended to encompass these modifications and variations.

What is claimed is:

1. A method for trusted measurement, comprising:
obtaining, when start-up of a system is completed, a first processing result by performing a first-manner processing on a code segment in a memory, and using a result obtained by performing a platform configuration register (PCR) extending operation on the first processing result as a first reference value, wherein the performing the first-manner processing on the code segment in the memory comprises performing a hash calculation on the code segment in the memory, and the performing the PCR extending operation on the first processing result comprises obtaining the first reference value by performing the hash calculation on the first processing result and a preset first value;
obtaining, at a first moment when the system is running, a second processing result by performing the first-manner processing on the code segment in the memory, and obtaining a first measurement value by performing the hash calculation on the second processing result and the first preset value;
determining whether the first measurement value and the first reference value are equal;
determining, when the first measurement value and the first reference value are equal, that the system is trusted, or determining, when the first measurement value and the first reference value are not equal, that the system is not trusted; and
when the first measurement value and the first reference value are equal, using a result obtained by performing the PCR extending operation on the second processing result as a first expected value, and the first expected value is used as a second reference value for a next trusted measurement when the system is still running;
wherein the code segment in the memory is a code segment that does not change with normal running of the system during one start-up and a running process of the system.

2. The method according to claim 1, wherein the first preset value is one of following: an initial value of a platform configuration register (PCR) after the system is restored, or a randomly generated value.

3. The method according to claim 1, wherein using a result obtained by performing the PCR extending operation on the second processing result as a first expected value comprises: obtaining the first expected value by performing the hash calculation on the second processing result and the first reference value; and
wherein when the first measurement value and the first reference value are equal, the method further comprises:
obtaining, at a second moment when the system is running, a third processing result by performing the first-manner processing on the code segment in the memory;
obtaining a second measurement value by performing the hash calculation on the third processing result and the first measurement value, wherein the second moment is after the first moment;
determining whether the second measurement value and the first expected value are equal; and
determining, when the second measurement value and the first expected value are equal, that the system is trusted, or determining, when the second measurement value and the first expected value are not equal, that the system is not trusted.

4. The method according to claim 3, wherein when the second measurement value and the first expected value are equal, the method further comprises:
obtaining a second expected value by performing the hash calculation on the third processing result and the first expected value.

5. The method according to claim 1, wherein using a result obtained by performing the PCR extending operation on the second processing result as a first expected value comprises: using a result obtained by performing the-hash calculation on the second processing result and the first reference value as a first expected value; and
wherein when the first measurement value and the first reference value are equal, the method further comprises:
when, from the first moment and after a period of time of a trusted measurement interval is exceeded, and a latest reference value is the same as the first expected value, the system is not trusted.

6. An apparatus, comprising a processor and a memory storing computer readable program code, said code executable by the processor to cause the apparatus to:
obtain, when start-up of a system is completed, a first processing result by performing a first-manner processing on a code segment in the memory, and obtain, at a first moment when the system is running, a second processing result by performing the first-manner processing on the code segment in the memory, wherein the performing the first-manner processing on the code segment in the memory comprises performing a hash calculation on the code segment in the memory; and
use a result obtained by performing a platform configuration register (PCR) extending operation on the first processing result and a preset first value as a first reference value, obtain a first measurement value by performing the hash calculation on the second processing result and the first preset value, and
determine whether the first measurement value and the first reference value are equal;
determine, when the first measurement value and the first reference value are equal, that the system is trusted, or determine, when the first measurement value and the first reference value are not equal, that the system is not trusted; and
when the first measurement value and the first reference value are equal, use a result obtained by performing the PCR extending operation on the second processing result as a first expected value, and the first expected value is used as a second reference value for a next trusted measurement when the system is still running,
wherein the code segment in the memory is a code segment that does not change with normal running of the system during one start-up and a running process of the system.

7. The apparatus according to claim 6, wherein the first preset value is one of following: an initial value of a platform configuration register (PCR) after the system is restored, or a randomly generated value.

8. The apparatus according to claim 6, wherein said code executable by the processor causes the apparatus to:
obtain, the first expected value by performing the hash calculation on the second processing result and the first reference value; and
wherein said code executable by the processor further causes the apparatus to:
obtain, at a second moment when the system is running, a third processing result by performing the first-manner processing on the code segment in the memory; and
obtain a second measurement value by performing the hash calculation on the third processing result and the first measurement value, wherein the second moment is after the first moment;
determine whether the second measurement value and the first expected value are equal; and
determine, when the second measurement value and the first expected value are equal, that the system is trusted or determine, when the second measurement value and the first expected value are not equal, that the system is not trusted.

9. The apparatus according to claim 8, wherein said code executable by the processor further causes the apparatus to: obtain a second expected value by performing the hash calculation on the third processing result and the first expected value when the second measurement value and the first expected value are equal.

10. The apparatus according to claim 6, wherein said code executable by the processor causes the apparatus to: use, when the first measurement value and the first reference value are equal, a result obtained by performing the hash calculation on the second processing result and the first reference value as a first expected value; and
wherein said code executable by the processor further causes the apparatus to:
when, from the first moment and after a period of time of a trusted measurement interval is exceeded, and a latest reference value is the same as the first expected value, the system is not trusted.

11. A computer program product comprising computer readable program code on a non-transitory computer readable medium, said code executable by a processor to cause an apparatus to:

obtain, when start-up of a system is completed, a first processing result by performing a first-manner processing on a code segment in a memory, and use a result obtained by performing a platform configuration register (PCR) extending operation on the first processing result as a first reference value, wherein the performing the first-manner processing on the code segment in the memory comprises performing a hash calculation on the code segment in the memory, and the performing the PCR extending operation on the first processing result comprises obtaining the first reference value by performing the hash calculation on the first processing result and a preset first value;

obtain, at a first moment when the system is running, a second processing result by performing the first-manner processing on the code segment in the memory, and obtain a first measurement value by performing the hash calculation on the second processing result and the first preset value;

determine whether the first measurement value and the first reference value are equal;

determine, when the first measurement value and the first reference value are equal, that the system is trusted, or determine, when the first measurement value and the first reference value are not equal, that the system is not trusted; and when the first measurement value and the first reference value are equal, use a result obtained by performing the PCR extending operation on the second processing result as a first expected value, and the first expected value is used as a second reference value for a next trusted measurement when the system is still running;

wherein the code segment in the memory is a code segment that does not change with normal running of the system during one start-up and a running process of the system.

12. The computer program product according to claim 11, wherein the first preset value is one of following: an initial value of a platform configuration register (PCR) after the system is restored, and a randomly generated value.

13. The computer program product according to claim 11, wherein said code executable by the processor causes the apparatus to: obtain, the first expected value by performing the hash calculation on the second processing result and the first reference value; and wherein said code executable by the processor further causes the apparatus to:

obtain, at a second moment when the system is running, a third processing result by performing the first-manner processing on the code segment in the memory; and obtain a second measurement value by performing the hash calculation on the third processing result and the first measurement value, wherein the second moment is after the first moment;

determine whether the second measurement value and the first expected value are equal; and determine, when the second measurement value and the first expected value are equal, that the system is trusted, or determine, when the second measurement value and the first expected value are not equal, that the system is not trusted.

14. The computer program product according to claim 13, wherein said code executable by the processor further causes the apparatus to: obtain a second expected value by performing the hash calculation on the third processing result and the first expected value when the second measurement value and the first expected value are equal.

* * * * *

UNITED STATES PATENT AND TRADEMARK OFFICE
CERTIFICATE OF CORRECTION

PATENT NO. : 10,713,352 B2  
APPLICATION NO. : 15/461244  
DATED : July 14, 2020  
INVENTOR(S) : Zhou et al.

Page 1 of 1

It is certified that error appears in the above-identified patent and that said Letters Patent is hereby corrected as shown below:

In the Claims

Claim 5: Column 17, Line 43: "performing the-hash calculation" should read -- performing the hash calculation --.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*